US011830486B2

(12) United States Patent
Sharifi et al.

(10) Patent No.: US 11,830,486 B2
(45) Date of Patent: Nov. 28, 2023

(54) DETECTING NEAR MATCHES TO A HOTWORD OR PHRASE

(71) Applicant: Google LLC, Mountain View, CA (US)

(72) Inventors: Matthew Sharifi, Kilchberg (CH); Victor Carbune, Winterthur (CH)

(73) Assignee: GOOGLE LLC, Mountain View, CA (US)

( * ) Notice: Subject to any disclaimer, the term of this patent is extended or adjusted under 35 U.S.C. 154(b) by 121 days.

(21) Appl. No.: 17/081,645

(22) Filed: Oct. 27, 2020

(65) Prior Publication Data

US 2022/0115011 A1 Apr. 14, 2022

Related U.S. Application Data

(60) Provisional application No. 63/091,237, filed on Oct. 13, 2020.

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/08* (2013.01); *G10L 25/51* (2013.01)

(58) Field of Classification Search
CPC ......... G10L 15/22; G10L 15/08; G10L 25/51; G10L 15/32; G10L 2015/223
See application file for complete search history.

(56) References Cited

U.S. PATENT DOCUMENTS 5,255,386 A * 10/1993 Prager .................... G06F 9/453
707/999.005
5,737,724 A * 4/1998 Atal ....................... G10L 15/10
704/251

(Continued)

OTHER PUBLICATIONS

European Patent Office; International Search Report and Written Opinion of PCT Application No. PCT/US2021/054606; 10 pages; dated Feb. 2, 2022.

(Continued)

*Primary Examiner* — Andrew C Flanders
*Assistant Examiner* — Parker Mayfield
(74) *Attorney, Agent, or Firm* — Gray Ice Higdon

(57) ABSTRACT

Techniques are described herein for identifying a failed hotword attempt. A method includes: receiving first audio data; processing the first audio data to generate a first predicted output; determining that the first predicted output satisfies a secondary threshold but does not satisfy a primary threshold; receiving second audio data; processing the second audio data to generate a second predicted output; determining that the second predicted output satisfies the secondary threshold but does not satisfy the primary threshold; in response to the first predicted output and the second predicted output satisfying the secondary threshold but not satisfying the primary threshold, and in response to the first spoken utterance and the second spoken utterance satisfying one or more temporal criteria relative to one another, identifying a failed hotword attempt; and in response to identifying the failed hotword attempt, providing a hint that is responsive to the failed hotword attempt.

19 Claims, 6 Drawing Sheets

(51) Int. Cl.
    *G10L 25/51*    (2013.01)
    *G10L 15/08*    (2006.01)

(56)        References Cited

U.S. PATENT DOCUMENTS 6,697,782 B1 *   2/2004   Iso-Sipila ............... G10L 15/08
                                                              704/275
    9,729,690 B2 *   8/2017   Byrne .................... H04M 1/645
    10,650,802 B2 *  5/2020   Kunitake ................ G10L 15/02
    2015/0161990 A1  6/2015   Sharifi
    2021/0012770 A1* 1/2021   Choudhary ............ G06F 3/167

OTHER PUBLICATIONS

Intellectual Property India; Examination Report issued in Application No. 202227064647; 7 pages; dated Jul. 27, 2023.

* cited by examiner

DETECTING NEAR MATCHES TO A HOTWORD OR PHRASE

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant", "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). Other hotwords (e.g., "No", "Stop", "Cancel", "Volume Up", "Volume Down", "Next Track", "Previous Track", etc.) may be mapped to various commands, and when the predicted output indicates that one of these hotwords is present, the mapped command may be processed by the client device. However, when predicted output indicates that a hotword is not present, corresponding audio data will be discarded without any further processing, thereby conserving resources and user privacy.

The above-mentioned and/or other machine learning models (e.g., additional machine learning models described below), whose predicted output dictates whether automated assistant function(s) are activated, perform well in many situations. However, in certain situations, an automated assistant may fail to recognize a request and/or response to the request. For example, in the case where a user does not know, does not remember, or misremembers a hotword, the user's utterance may constitute a failed hotword attempt, and the automated assistant may fail to recognize or respond to the failed hotword attempt.

In some cases, an automated assistant may recognize different sets of hotwords in different contexts (e.g., time of day) or based on running applications (e.g., foreground applications). For example, if a music application is currently playing music, the automated assistant may recognize additional hotwords such as "pause music", "volume up", and "volume down". However, the differing sets of hotwords available at different times (e.g., "good morning" may be active only in the morning) may cause confusion for a user. In the case where a user does not know, or does not remember which hotwords are available in a particular context or misremembers a hotword, the user's utterance may constitute a failed hotword attempt, and the automated assistant may fail to recognize or respond to the failed hotword attempt. For example, a user may say "volume increase" or "loudness up" instead of "volume up", and the automated assistant may not recognize and respond to this request.

In situations where the automated assistant does not recognize and respond to requests because a user does not know, does not remember, or misremembers a hotword, the automated assistant may not provide feedback to the user. Consequently, it may be difficult for a user to determine whether the automated assistant failed to recognize the user's utterance or the user's utterance included an unsupported word or phrase (e.g., a word or phrase that is not a hotword, potentially due to the user not knowing, not remembering, or misremembering supported hotword(s)). In cases where the user's utterance includes an unsupported word or phrase, the user may incorrectly perceive that the automated assistant fails to recognize the user's utterance, and therefore the user may repeat the same unsupported word or phrase in one or more subsequent utterances, often in short succession. In this case, however, the automated assistant may also fail to respond to the subsequent utterance(s) as they also fail to include a supported hotword and merely include a repetition of the same unsupported word or phrase.

Occurrences of failed hotword attempts can prolong the human/automated assistant interaction, forcing the human to repeat the utterance (and/or perform other action(s)) that were initially intended to activate automated assistant functions. In addition, occurrences of failed hotword attempts can waste network and/or computational resources.

SUMMARY

Some implementations disclosed herein are directed to improving performance of machine learning model(s) through automatic identification of failed hotword attempts. As described in more detail herein, such machine learning models can include, for example, hotword detection models and/or other machine learning models. Various implementations detect situations in which a user is attempting to trigger a hotword but is failing (i.e., a failed hotword attempt). In response to detecting such a situation, the system can provide a hint to the user regarding available hotword(s). In other implementations, the system can adapt by adding a user's preferred word or phrase to the available hotword(s).

In some implementations, the system may detect near matches to a hotword. For example, an automated assistant might support a range of specific media playback commands including "volume up", "volume down", "next track", and "previous track". If a user misremembers one of these commands, the user might say "previous song" instead of "previous track". Conventional systems may not provide feedback about what is wrong, or what the correct phrase should be. Various implementations may address this vocabulary problem where it may not be clear which phrases a user can say at any given point in time, by providing a hint to a user regarding one or more supported hotwords. Additionally, implementations may provide a user with a mechanism to train custom hotwords.

In some implementations, the system may detect a series of weak hotword model triggers. For example, in the case where a user speaks a supported hotword, a hotword detection model may generate a predicted output that indicates a high confidence detection of a hotword. In the case where the user speaks a variant or near-match of a hotword (e.g., a word or phrase that is acoustically similar to the hotword but not the supported hotword), the hotword detection model may generate a predicted output that indicates a medium confidence detection of a hotword (e.g., higher than a baseline level but lower than the high confidence predicted output when the user speaks the supported hotword). In this case, the medium confidence detection may not be high enough for the system to determine that a hotword was spoken (e.g., the confidence level may be lower than a primary threshold). In implementations, the system looks for a succession of similar near-match triggers and, based on such a succession of near-match triggers, automatically identifies a failed hotword attempt. Accordingly, this can improve performance and flexibility by allowing an automated assistant to respond to near-match triggers, reducing processing and power usage at the automated assistant and reducing the number of attempts a user needs to make to be understood. For example, in implementations, the automated assistant may respond to commands that are slight acoustic variants of a supported hotword.

In some implementations, when a failed hotword attempt is identified, a set of gradients is generated locally at the client device based on comparing the predicted output to ground truth output (e.g., ground truth output that satisfies the threshold). In some implementations, the generated gradients are used, by one or more processor(s) of the client device, to update one or more weights of the machine learning model based on the generated gradients. For example, backpropagation and/or other technique(s) can be used to update the weights based on the gradients. In this way, the system can adapt by adding a user's preferred word or phrase to the available hotword(s). This can improve performance of the machine learning model stored locally at the client device, mitigating the occurrence of failed hotword attempts based on predicted outputs generated using the machine learning model.

In some implementations, the generated gradients are additionally or alternatively transmitted, by the client device and over a network, to a remote system. In those implementations, the remote system utilizes the generated gradients, and additional gradients from additional client devices, to update global weights of a corresponding global machine learning model using federated learning techniques. The additional gradients from the additional client devices can be similarly generated, locally at the corresponding additional client devices. In various implementations, the client device transmits the generated gradients without transmitting any of the data (e.g., audio data and/or other sensor data) that was utilized to generate the predicted output, and without transmitting any of the data (e.g., further user interface input) that was utilized to identify a failed hotword attempt. The remote system can utilize the generated gradients in updating the global model using federated learning techniques, without any reference to or use of such data. The transmitting of only the gradients utilizes less network resources than transmitting of the larger data size data used to generate the predicted output and to identify the failed hotword attempt. Further, transmitting of the gradients preserves privacy and security of personal data, as the data utilized in generating the predicted output and in identifying the failed hotword attempt, may not be derivable from the gradients. In some implementations, one or more differential privacy techniques (e.g., adding Gaussian noise) can be utilized to further ensure such data is not derivable from the gradients.

In implementations where the remote system updates global weights of the speech recognition model, the remote system can thereafter provide the updated global weights to client devices to cause the client devices to replace weights of their on-device machine learning models with the updated global weights. In some implementations, the remote system can additionally or alternatively provide the updated machine learning model to client devices to cause the client devices to replace their on-device machine learning models with the updated global machine learning model. On-device performance is therefore improved through utilization of the updated global weights or updated global machine learning model.

In various implementations, a method implemented by one or more processors may include receiving, via one or more microphones of a client device, first audio data that captures a first spoken utterance of a user; processing the first audio data using one or more machine learning models to generate a first predicted output that indicates a probability of one or more hotwords being present in the first audio data; determining that the first predicted output satisfies a secondary threshold that is less indicative of the one or more hotwords being present in audio data than is a primary threshold but does not satisfy the primary threshold; receiving, via the one or more microphones of the client device, second audio data that captures a second spoken utterance of a user; processing the second audio data using the one or more machine learning models to generate a second predicted output that indicates a probability of the one or more hotwords being present in the second audio data; determining that the second predicted output satisfies the secondary threshold but does not satisfy the primary threshold; in response to the first predicted output and the second predicted output satisfying the secondary threshold but not satisfying the primary threshold, and in response to the first spoken utterance and the second spoken utterance satisfying one or more temporal criteria relative to one another, identifying a failed hotword attempt; and in response to identifying the failed hotword attempt, providing a hint that is responsive to the failed hotword attempt.

In some implementations, identifying the failed hotword attempt may be further in response to determining that a similarity between the first spoken utterance and the second spoken utterance exceeds a similarity threshold. In some implementations, identifying the failed hotword attempt may be further in response to determining that the probability indicated by the first predicted output and the probability indicated by the second predicted output correspond to a same hotword of the one or more hotwords. In some implementations, a model conditioned on acoustic features may be used to determine that the first audio data and the second audio data include a command, and the identifying the failed hotword attempt is further in response to the first audio data and the second audio data including the command.

In some implementations, an intended hotword corresponding to the failed hotword attempt may be determined. In some implementations, the intended hotword may be determined based on acoustic similarity between at least a portion of the first audio data, at least a portion of the second audio data, and the intended hotword. This may be an implicit acoustic similarity (e.g., obtained via a probability from the hotword model). In some implementations, providing the hint may include displaying the intended hotword on a display of the client device or providing, by the client device, an audio response that includes the intended hotword. In some implementations, an action corresponding to the intended hotword may be performed.

In some additional or alternative implementations, a computer program product may include one or more computer-readable storage media having program instructions collectively stored on the one or more computer-readable storage media. The program instructions may be executable to: receive, via one or more microphones of a client device, first audio data that captures a first spoken utterance of a user; process the first audio data using each of a plurality of classes in a machine learning model to generate a corresponding probability associated with the first audio data, each of the classes being associated with a corresponding hotword of a plurality of hotwords and each of the corresponding probabilities being associated with a probability of the corresponding hotword being present in the first audio data; determine that the probability of one of the plurality of hotwords being present in the first audio data satisfies a secondary threshold that is less indicative of the one of the plurality of hotwords being present in audio data than is a primary threshold but does not satisfy the primary threshold; receive, via the one or more microphones of the client device, second audio data that captures a second spoken utterance of a user; process the second audio data using each of the plurality of classes in the machine learning model to generate a corresponding probability associated with the second audio data, each of the corresponding probabilities being associated with a probability of the corresponding hotword being present in the second audio data; determine that the probability of the one of the plurality of hotwords being present in the second audio data satisfies the secondary threshold but does not satisfy the primary threshold; in response to the probability of the one of the plurality of hotwords being present in the first audio data satisfying the secondary threshold but not satisfying the primary threshold and the probability of the one of the plurality of hotwords being present in the second audio data satisfying the secondary threshold but not satisfying the primary threshold, and in response to the first spoken utterance and the second spoken utterance satisfying one or more temporal criteria relative to one another, identify a failed hotword attempt; and in response to identifying the failed hotword attempt, provide a hint that is responsive to the failed hotword attempt.

In some implementations, identifying the failed hotword attempt is further in response to determining that a similarity between the first spoken utterance and the second spoken utterance exceeds a similarity threshold. In some implementations, the program instructions are further executable to determine, using a model conditioned on acoustic features (e.g., prosody, non-verbal vocalizations, or other types of inferred audio command properties), that the first audio data and the second audio data include a command; and identifying the failed hotword attempt is further in response to the first audio data and the second audio data including the command.

In some implementations, the program instructions are further executable to determine an intended hotword corresponding to the failed hotword attempt. In some implementations, the intended hotword is determined based on acoustic similarity between at least a portion of the first audio data, at least a portion of the second audio data, and the intended hotword.

In some implementations, providing the hint includes displaying the intended hotword on a display of the client device or providing, by the client device, an audio response that includes the intended hotword. In some implementations, the program instructions are further executable to perform an action corresponding to the intended hotword.

In some additional or alternative implementations, a system may include a processor, a computer-readable memory, one or more computer-readable storage media, and program instructions collectively stored on the one or more computer-readable storage media. The program instructions may be executable to: receive, via one or more microphones of a client device, first audio data that captures a first spoken utterance of a user; process the first audio data using one or more machine learning models to generate a first predicted output that indicates a probability of one or more hotwords being present in the first audio data; determine that the first predicted output satisfies a secondary threshold that is less indicative of the one or more hotwords being present in audio data than is a primary threshold but does not satisfy the primary threshold; receive, via the one or more microphones of the client device, second audio data that captures a second spoken utterance of a user; process the second audio data using the one or more machine learning models to generate a second predicted output that indicates a probability of the one or more hotwords being present in the second audio data; determine that the second predicted output satisfies the secondary threshold but does not satisfy the primary threshold; in response to the first predicted output and the second predicted output satisfying the secondary threshold but not satisfying the primary threshold, and in response to the first spoken utterance and the second spoken utterance satisfying one or more temporal criteria relative to one another, identify a failed hotword attempt; and in response to identifying the failed hotword attempt, perform an action based on the failed hotword attempt.

Through utilization of one or more techniques described herein, occurrences of failed hotword attempts can be identified locally at a corresponding client device. Further, hints that are responsive to the failed hotword attempts can be provided, and actions corresponding to the failed hotword attempts can be performed. In implementations, the system looks for a succession of similar near-match triggers and, based on such a succession of near-match triggers, automatically identifies a failed hotword attempt. This results in improved performance and flexibility by allowing an automated assistant to provide hints regarding hotwords and to respond to near-match triggers, reducing processing and power usage at the automated assistant and reducing the number of attempts a user needs to make to be understood.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1A:
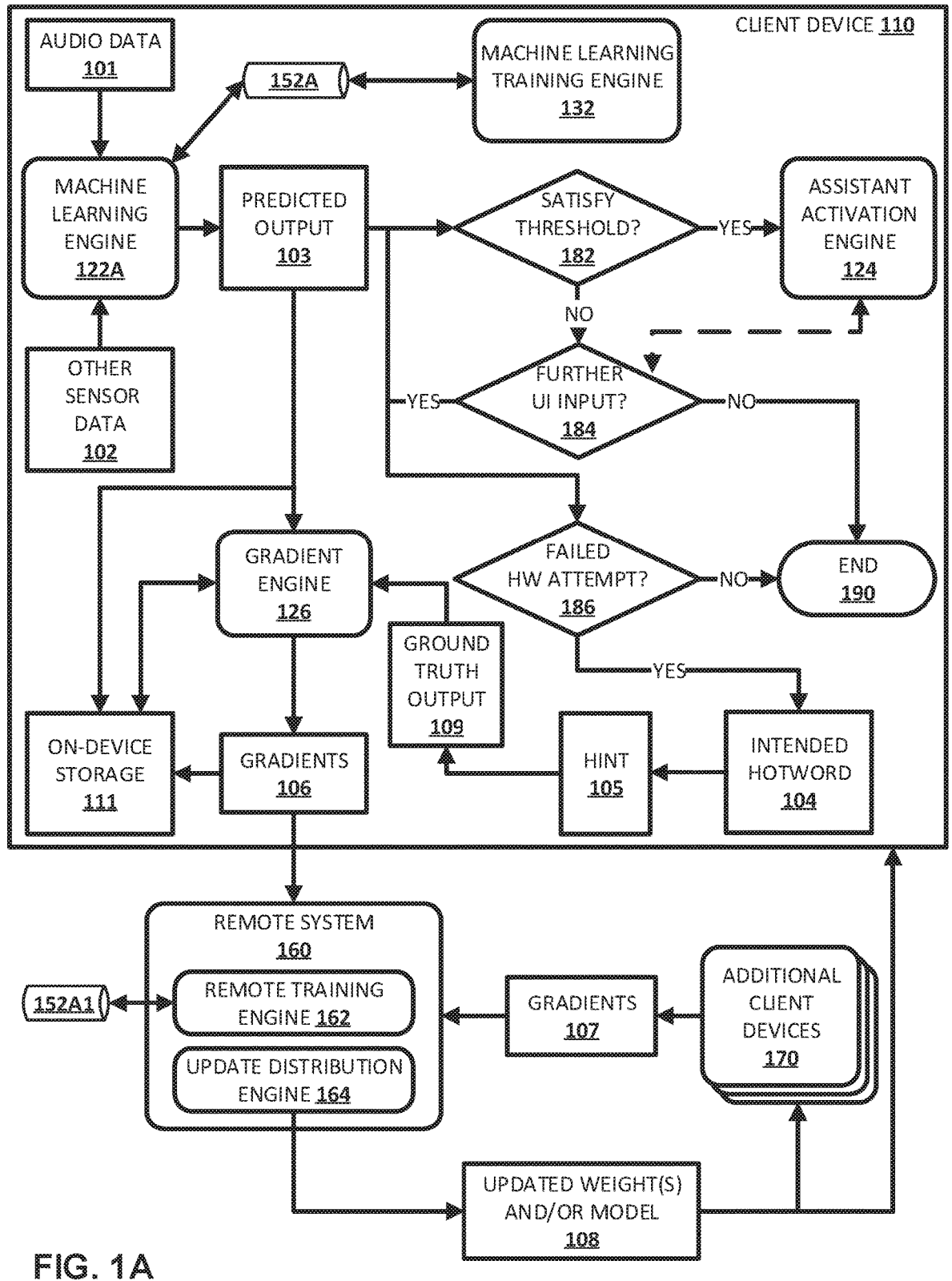
FIGS. 1A and 1B depict example process flows that demonstrate various aspects of the present disclosure, in accordance with various implementations.
Figure 1B:
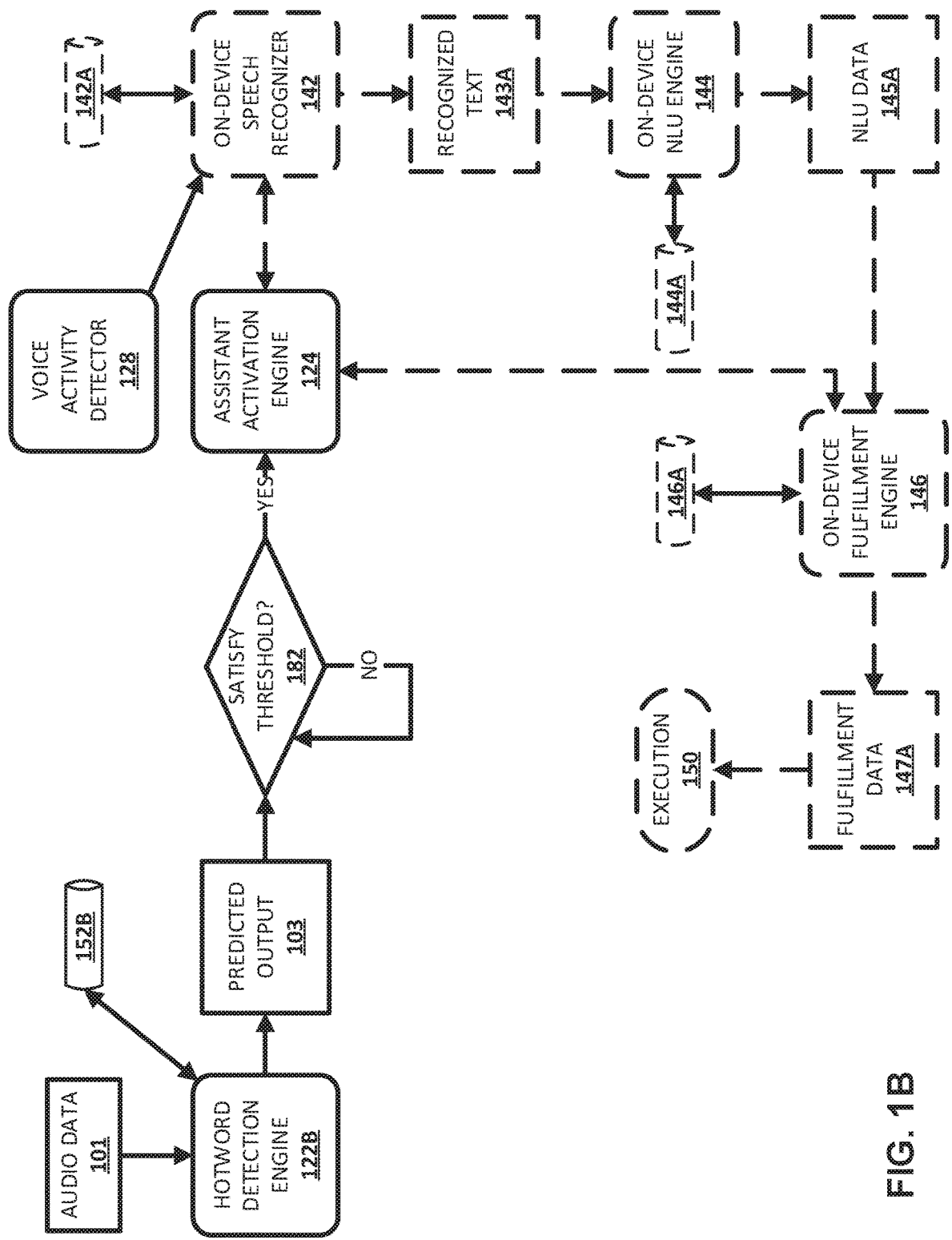

FIGS. 1A and 1B depict example process flows that demonstrate various aspects of the present disclosure. A client device 110 is illustrated in FIG. 1A, and includes the components that are encompassed within the box of FIG. 1A that represents the client device 110. Machine learning engine 122A can receive audio data 101 corresponding to a spoken utterance detected via one or more microphones of the client device 110 and/or other sensor data 102 corresponding to utterance free physical movement(s) (e.g., hand gesture(s) and/or movement(s), body gesture(s) and/or body movement(s), eye gaze, facial movement, mouth movement, etc.) detected via one or more non-microphone sensor components of the client device 110. The one or more non-microphone sensors can include camera(s) or other vision sensor(s), proximity sensor(s), pressure sensor(s), accelerometer(s), magnetometer(s), and/or other sensor(s). The machine learning engine 122A processes the audio data 101 and/or the other sensor data 102, using machine learning model 152A, to generate a predicted output 103. As described herein, the machine learning engine 122A can be a hotword detection engine 122B or an alternative engine, such as a voice activity detector (VAD) engine, an endpoint detector engine, a speech recognition (ASR) engine, and/or other engine(s).

In some implementations, when the machine learning engine 122A generates the predicted output 103, it can be stored locally on the client device in on-device storage 111, and optionally in association with the corresponding audio data 101 and/or the other sensor data 102. In some versions of those implementations, the predicted output can be retrieved by gradient engine 126 for utilization in generating gradients 106 at a later time, such as when one or more conditions described herein are satisfied. The on-device storage 111 can include, for example, read-only memory (ROM) and/or random-access memory (RAM). In other implementations, the predicted output 103 can be provided to the gradient engine 126 in real-time.

The client device 110 can make a decision, based on determining whether the predicted output 103 satisfies a threshold at block 182, of whether to initiate currently dormant automated assistant function(s) (e.g., automated assistant 295 of FIG. 2), refrain from initiating currently dormant automated assistant function(s), and/or shut down currently active automated assistant function(s) using an assistant activation engine 124. The automated assistant functions can include: speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions that are responsive to the audio data 101 (e.g., a common task such as changing the device volume). For example, assume the predicted output 103 is a probability (e.g., 0.80 or 0.90) and the threshold at block 182 is a threshold probability (e.g., 0.85). If the client device 110 determines the predicted output 103 (e.g., 0.90) satisfies the threshold (e.g., 0.85) at block 182, then the assistant activation engine 124 can initiate the currently dormant automated assistant function(s).

In some implementations, and as depicted in FIG. 1B, the machine learning engine 122A can be a hotword detection engine 122B. Notably, various automated assistant function(s), such as on-device speech recognizer 142, on-device NLU engine 144, and/or on-device fulfillment engine 146, are currently dormant (i.e., as indicated by dashed lines). Further, assume that the predicted output 103, generated using a hotword detection model 152B and based on the audio data 101, satisfies the threshold at block 182, and that voice activity detector 128 detects user speech directed to the client device 110.

In some versions of these implementations, the assistant activation engine 124 activates the on-device speech recognizer 142, the on-device NLU engine 144, and/or the on-device fulfillment engine 146 as the currently dormant automated assistant function(s). For example, the on-device speech recognizer 142 can process the audio data 101 for a spoken utterance, including a hotword "OK Assistant" and additional commands and/or phrases that follow the hotword "OK Assistant", using on-device speech recognition model 142A, to generate recognized text 143A, the on-device NLU engine 144 can process the recognized text 143A, using on-device NLU model 144A, to generate NLU data 145A, the on-device fulfillment engine 146 can process the NLU data 145A, using on-device fulfillment model 146A, to generate fulfillment data 147A, and the client device 110 can use the fulfillment data 147A in execution 150 of one or more actions that are responsive to the audio data 101.

In other versions of these implementations, the assistant activation engine 124 activates the only on-device fulfillment engine 146, without activating the on-device speech recognizer 142 and the on-device NLU engine 144, to process various commands, such as "No", "Stop", "Cancel", "Volume Up", "Volume Down", "Next Track", "Previous Track", and/or other commands that can be processed without the on-device speech recognizer 142 and the on-device NLU engine 144. For example, the on-device fulfillment engine 146 processes the audio data 101, using the on-device fulfillment model 146A, to generate the fulfillment data 147A, and the client device 110 can use the fulfillment data 147A in execution 150 of one or more actions that are responsive to the audio data 101. Moreover, in versions of these implementations, the assistant activation engine 124 can initially activate the currently dormant automated function(s) to verify the decision made at block 182 was correct (e.g., the audio data 101 does in fact include the hotword "OK Assistant") by initially only activating the on-device speech recognizer 142 to determine the audio data 101 include the hotword "OK Assistant", and/or the assistant activation engine 124 can transmit the audio data 101 to one or more servers (e.g., remote server 160) to verify the decision made at block 182 was correct (e.g., the audio data 101 does in fact include the hotword "OK Assistant").

Turning back to FIG. 1A, if the client device 110 determines the predicted output 103 (e.g., 0.80) fails to satisfy the threshold (e.g., 0.85) at block 182, then the assistant activation engine 124 can refrain from initiating the currently dormant automated assistant function(s) and/or shut down any currently active automated assistant function(s). Further, if the client device 110 determines the predicted output 103 (e.g., 0.80) fails to satisfy the threshold (e.g., 0.85) at block 182, then the client device 110 can determine if further user interface input is received at block 184. For example, the further user interface input can be an additional spoken utterance that includes a hotword, additional utterance free physical movement(s) that serve as a proxy for a hotword, actuation of an explicit automated assistant invocation button (e.g., a hardware button or software button), a sensed "squeeze" of the client device 110 device (e.g., when squeezing the client device 110 with at least a threshold amount of force invokes the automated assistant), and/or other explicit automated assistant invocation. If the client device 110 determines there is no further user interface input received at block 184, then the client device 110 can end at block 190.

However, if the client device 110 determines there is further user interface input received at block 184, then the system can determine at block 186 whether the further user interface input received at block 184, in conjunction with the previously received user interface input that failed to satisfy the threshold at block 182, is indicative of a failed hotword attempt. The failed hotword attempt can be a result of a user attempting to invoke the assistant (or a particular action by the assistant) using a word or phrase that is not a hotword but that is a near-match to a hotword (e.g., acoustically similar to a hotword). The failed hotword attempt can also be a result of a user attempting to invoke the assistant (or a particular action by the assistant) using a word or phrase that is not a hotword but that is semantically similar to a hotword.

If the client device 110 determines the further user interface input received at block 184 is not indicative of a failed hotword attempt at block 186, the client device 110 can end at block 190. However, if the client device 110 determines that the further user interface input received at block 184 is indicative of a failed hotword attempt at block 186, then the client device 110 can determine the intended hotword 104 and provide a hint 105. In some implementations, the client device 110 can also determine a ground truth output 109, which can be a probability (e.g., 1.00) that indicates the client device 110 should have initiated currently dormant automated assistant function(s) and/or refrained from shutting down currently active automated assistant function(s).

In some implementations, if the client device 110 determines that the further user interface input received at block 184 is indicative of a failed hotword attempt at block 186, the assistant activation engine 124 of the client device 110 may initiate one or more currently dormant automated assistant functions as the user intended (e.g., based on the intended hotword 104).

In some implementations, the gradient engine 126 can generate the gradients 106 based on the predicted output 103 to the ground truth output 109. For example, the gradient engine 126 can generate the gradients 106 based on comparing the predicted output 103 to the ground truth output 109. In some versions of those implementations, the client device 110 stores, locally in the on-device storage 111, the predicted output 103 and the corresponding ground truth output 109, and the gradient engine 126 retrieves the predicted output 103 and the corresponding ground truth output 109 to generate the gradients 106 when one or more conditions are satisfied. The one or more conditions can include, for example, that the client device is charging, that the client device has at least a threshold state of charge, that a temperature of the client device (based on one or more on-device temperature sensors) is less than a threshold, and/or that the client device is not being held by a user. In other versions of those implementations, the client device 110 provides the predicted output 103 and the ground truth output 109 to the gradient engine 126 in real-time, and the gradient engine 126 generates the gradients 106 in real-time.

Moreover, the gradient engine 126 can provide the generated gradients 106 to on-device machine learning training engine 132. The on-device machine learning training engine 132, when it receives the gradients 106, uses the gradients 106 to update the on-device machine learning model 152A. For example, the on-device machine learning training engine 132 can utilize backpropagation and/or other techniques to update the on-device machine learning model 152A. It is noted that, in some implementations, the on-device machine learning training engine 132 can utilize batch techniques to update the on-device machine learning model 152A based on the gradients 106 and additional gradients determined locally at the client device 110 on the basis of additional failed hotword attempts. In some implementations, the on-device machine learning training engine 132 may ask a user to train a new command on-device (by providing multiple examples) and update the on-device machine learning model 152A based on the training.

Further, the client device 110 can transmit the generated gradients 106 to a remote system 160. When the remote system 160 receives the gradients 106, a remote training engine 162 of the remote system 160 uses the gradients 106, and additional gradients 107 from additional client devices 170, to update global weights of a global hotword model 152A1. The additional gradients 107 from the additional client devices 170 can each be generated based on the same or similar technique as described above with respect to the gradients 106 (but on the basis of locally identified failed hotword attempts that are particular to those client devices).

An update distribution engine 164 can, responsive to one or more conditions being satisfied, provide, to the client device 110 and/or other client device(s), the updated global weights and/or the updated global hotword model itself, as indicated by 108. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device machine learning model 152A, with the updated weights. When the updated global hotword model is provided to the client device 110, the client device 110 can replace the on-device machine learning model 152A with the updated global hotword model. In other implementations, the client device 110 may download a more suitable hotword model (or models) from a server based on the types of commands the user expects to speak and replace the on-device machine learning model 152A with the downloaded hotword model.

In some implementations, the on-device machine learning model 152A is transmitted (e.g., by the remote system 160 or other component(s)) for storage and use at the client device 110, based on a geographic region and/or other properties of the client device 110 and/or a user of the client device 110. For example, the on-device machine learning model 152A can be one of N available machine learning models for a given language, but can be trained based on corrections that are specific to a particular geographic region, device type, context (e.g., music playing), etc., and provided to client device 110 based on the client device 110 being primarily located in the particular geographic region.

Figure 2:
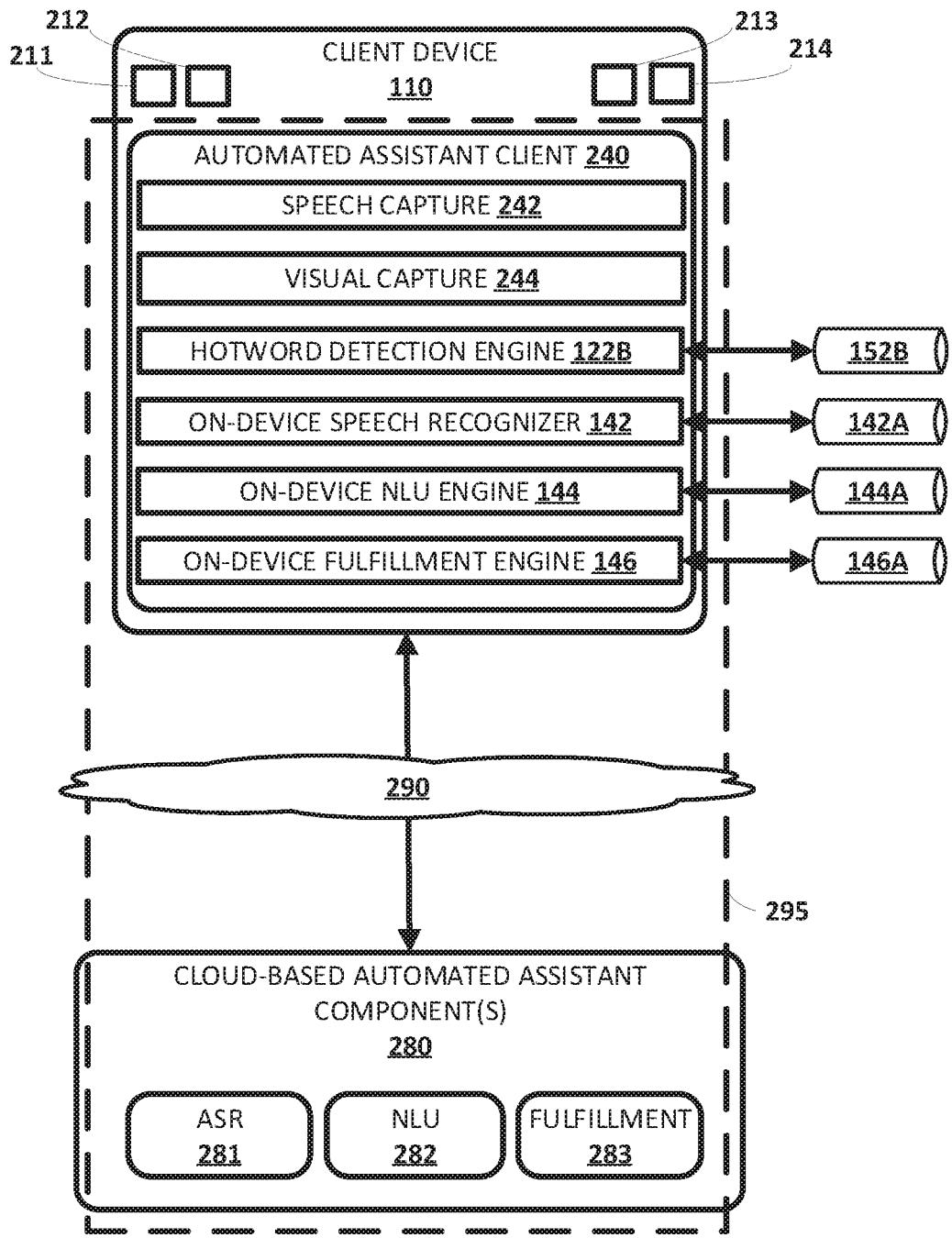
FIG. 2 depicts a block diagram of an example environment that includes various components from FIGS. 1A and 1B, and in which implementations disclosed herein may be implemented.

Turning now to FIG. 2, client device 110 is illustrated in an implementation where the various on-device machine learning engines of FIGS. 1A and 1B are included as part of (or in communication with) an automated assistant client 240. The respective machine learning models are also illustrated interfacing with the various on-device machine learning engines of FIGS. 1A and 1B. Other components from FIGS. 1A and 1B are not illustrated in FIG. 2 for simplicity. FIG. 2 illustrates one example of how the various on-device machine learning engines of FIGS. 1A and 1B and their respective machine learning models can be utilized by the automated assistant client 240 in performing various actions.

The client device 110 in FIG. 2 is illustrated with one or more microphones 211, one or more speakers 212, one or more cameras and/or other vision components 213, and display(s) 214 (e.g., a touch-sensitive display). The client device 110 may further include pressure sensor(s), proximity sensor(s), accelerometer(s), magnetometer(s), and/or other sensor(s) that are used to generate other sensor data that is in addition to audio data captured by the one or more microphones 211. The client device 110 at least selectively executes the automated assistant client 240. The automated assistant client 240 includes, in the example of FIG. 2, the on-device hotword detection engine 122B, the on-device speech recognizer 142, the on-device natural language understanding (NLU) engine 144, and the on-device fulfillment engine 146. The automated assistant client 240 further includes speech capture engine 242 and visual capture engine 244. The automated assistant client 140 can include additional and/or alternative engines, such as a voice activity detector (VAD) engine, an endpoint detector engine, and/or other engine(s).

One or more cloud-based automated assistant components 280 can optionally be implemented on one or more computing systems (collectively referred to as a "cloud" computing system) that are communicatively coupled to client device 110 via one or more local and/or wide area networks (e.g., the Internet) indicated generally at 290. The cloud-based automated assistant components 280 can be implemented, for example, via a cluster of high-performance servers.

In various implementations, an instance of an automated assistant client 240, by way of its interactions with one or more cloud-based automated assistant components 280, may form what appears to be, from a user's perspective, a logical instance of an automated assistant 295 with which the user may engage in human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 242, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 2, and/or other engine(s).

Speech capture engine 242 can be configured to capture user's speech and/or other audio data captured via microphone(s) 211. Further, the client device 110 may include pressure sensor(s), proximity sensor(s), accelerometer(s), magnetometer(s), and/or other sensor(s) that are used to generate other sensor data that is in addition to the audio data captured via the microphone(s) 211. As described herein, such audio data and other sensor data can be utilized by the hotword detection engine 122B and/or other engine(s) to determine whether to initiate one or more currently dormant automated assistant functions, refrain from initiating one or more currently dormant automated assistant functions, and/or shut down one or more currently active automated assistant functions. The automated assistant functions can include the on-device speech recognizer 142, the on-device NLU engine 144, the on-device fulfillment engine 146, and additional and/or alternative engines. For example, on-device speech recognizer 142 can process audio data that captures a spoken utterance, utilizing on-device speech recognition model 142A, to generate recognized text 143A that corresponds to the spoken utterance. On-device NLU engine 144 performs on-device natural language understanding, optionally utilizing on-device NLU model 144A, on the recognized text 143A to generate NLU data 145A. The NLU data 145A can include, for example, intent(s) that correspond to the spoken utterance and optionally parameter(s) (e.g., slot values) for the intent(s). Further, the on-device fulfillment engine 146 generates the fulfillment data 147A, optionally utilizing on-device fulfillment model 146A, based on the NLU data 145A. This fulfillment data 147A can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data 147A is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 214 can be utilized to display the recognized text 143A and/or the further recognized text 143B from the on-device speech recognizer 122, and/or the hint 105 (which may include the intended hotword 104), and/or one or more results from the execution 150. Display(s) 214 can further be one of the user interface output component(s) through which visual portion(s) of a response, from the automated assistant client 240, is rendered.

In some implementations, the one or more speakers 212 can be used to provide the hint 105, which may be an audio response that includes the intended hotword 104.

In some implementations, cloud-based automated assistant component(s) 280 can include a remote ASR engine 281 that performs speech recognition, a remote NLU engine 282 that performs natural language understanding, and/or a remote fulfillment engine 283 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, the on-device fulfillment engine 146 can fail in certain situations (e.g., due to relatively limited resources of client device 110) and remote fulfillment engine 283 can utilize the more robust resources of the cloud to generate fulfillment data in such situations. The remote fulfillment engine 283 can be operated in parallel with the on-device fulfillment engine 146 and its results utilized when on-device fulfillment fails, or can be invoked responsive to determining failure of the on-device fulfillment engine 146.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 295. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 3:
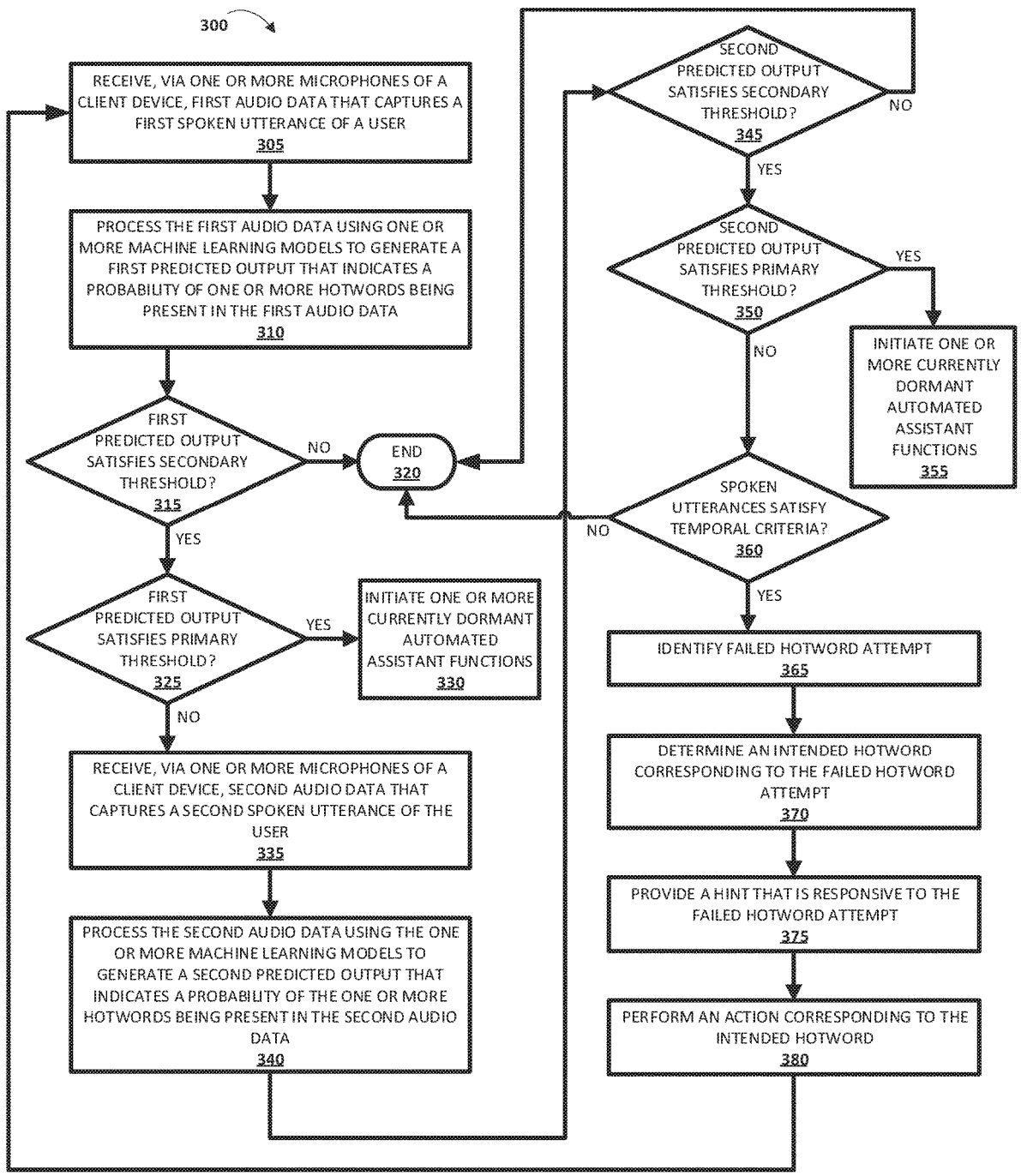
FIG. 3 depicts a flowchart illustrating an example method of identifying a failed hotword attempt, in accordance with various implementations.

FIG. 3 depicts a flowchart illustrating an example method 300 of identifying a failed hotword attempt. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At block 305, the system receives, via one or more microphones of a client device, first audio data that captures a first spoken utterance of a user.

At block 310, the system processes the first audio data received at block 305 using one or more machine learning models to generate a first predicted output that indicates a probability of one or more hotwords being present in the first audio data. The one or more machine learning models can be, for example, on-device hotword detection models and/or other machine learning models. Each of the machine learning models may be a deep neural network or any other type of model and may be trained to recognize one or more hotwords. Further, the generated output can be, for example, a probability and/or other likelihood measures.

Still referring to block 310, in an example, the machine learning model may be a hotword model that is trained to recognize, as a single class, a hotword that includes multiple words. If the first audio data includes the words, "next song", and the machine learning model is trained to recognize "next track", the machine learning model may generate a first predicted output of 0.5 due to there being some level of acoustic similarity between "next song" and "next track". In another example, a single machine learning model with multiple classes may be used, and each class may detect an individual word from a specific set of hotwords. Alternatively, multiple machine learning models may be used, and each model may detect an individual word from a specific set of hotwords. In this example, the system may generate a high confidence match for the "next" class but no other matches.

At block 315, the system determines whether or not the first predicted output generated at block 310 satisfies a secondary threshold that is less indicative of the one or more hotwords being present in audio data than is a primary threshold (e.g., the secondary threshold can be a medium confidence threshold, and the primary threshold can be a high confidence threshold). If, at an iteration of block 315, the system determines that the first predicted output generated at block 310 does not satisfy the secondary threshold, then the system proceeds to block 320, and the flow ends. On the other hand, if, at an iteration of block 315, the system determines that the first predicted output generated at block 310 satisfies the secondary threshold, then the system proceeds to block 325. In implementations, the primary and secondary thresholds may vary based on a hotword, command, device, and/or context.

Still referring to block 315, in an example, assume the first predicted output, generated at block 310, is a probability and the probability must be greater than 0.65 to satisfy the secondary threshold at block 315, and the predicted probability is 0.88. Based on the predicted probability of 0.88 satisfying the secondary threshold of 0.65, the system proceeds to block 325.

At block 325, the system determines whether or not the first predicted output generated at block 310 satisfies the primary threshold. If, at an iteration of block 325, the system determines that the first predicted output generated at block 310 does not satisfy the primary threshold, then the system proceeds to block 335. On the other hand, if, at an iteration of block 325, the system determines that the first predicted output generated at block 310 satisfies the primary threshold, then the system proceeds to block 330 and initiates one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions that are responsive to the first audio data (e.g., a common task such as changing the device volume).

Still referring to block 330, in an example, assume the first predicted output, generated at block 310, is a probability and the probability must be greater than 0.85 to satisfy the primary threshold at block 325 and activate one or more currently dormant automated assistant functions at block 330, and the predicted probability is 0.88. Based on the predicted probability of 0.88 satisfying the threshold of 0.85, the system proceeds to block 330 and initiates the one or more currently dormant automated assistant functions as the user intended.

At block 335, the system receives, via one or more microphones of the client device, second audio data that captures a second spoken utterance of the user.

At block 340, the system processes the second audio data received at block 335 using the one or more machine learning models to generate a second predicted output that indicates a probability of the one or more hotwords being present in the second audio data. The one or more machine learning models can be, for example, on-device hotword detection models and/or other machine learning models. Further, the generated output can be, for example, a probability and/or other likelihood measures.

At block 345, the system determines whether or not the second predicted output generated at block 340 satisfies the secondary threshold. If, at an iteration of block 345, the system determines that the second predicted output generated at block 340 does not satisfy the secondary threshold, then the system proceeds to block 320, and the flow ends. On the other hand, if, at an iteration of block 345, the system determines that the second predicted output generated at block 340 satisfies the secondary threshold, then the system proceeds to block 350.

Still referring to block 345, in an example, assume the second predicted output, generated at block 340, is a probability and the probability must be greater than 0.65 to satisfy the secondary threshold at block 345, and the predicted probability is 0.88. Based on the predicted probability of 0.88 satisfying the secondary threshold of 0.65, the system proceeds to block 350.

At block 350, the system determines whether or not the second predicted output generated at block 340 satisfies the primary threshold. If, at an iteration of block 350, the system determines that the second predicted output generated at block 340 does not satisfy the primary threshold, then the system proceeds to block 360. On the other hand, if, at an iteration of block 350, the system determines that the second predicted output generated at block 340 satisfies the primary threshold, then the system proceeds to block 355 and initiates one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions that are responsive to the second audio data (e.g., a common task such as changing the device volume).

Referring to block 350, in other implementations, if, at an iteration of block 350, the system determines that the predicted output generated at block 340 does not satisfy the primary threshold, then the system may return to block 335, one or more times, and blocks 335 to 350 may be repeated using third audio data that captures a third spoken utterance of the user, and so on.

Referring to block 355, in an example, assume the second predicted output, generated at block 340, is a probability and the probability must be greater than 0.85 to satisfy the primary threshold at block 350 and activate one or more currently dormant automated assistant functions at block 355, and the predicted probability is 0.88. Based on the predicted probability of 0.88 satisfying the threshold of 0.85, the system proceeds to block 355 and initiates the one or more currently dormant automated assistant functions as the user intended.

At block 360, the system determines whether or not the first spoken utterance captured by the first audio data received at block 305 and the second spoken utterance captured by the second audio data received at block 335 satisfy one or more temporal criteria relative to one another (e.g., the utterances are separated by fewer than 10 seconds). If, at an iteration of block 360, the system determines that it is not the case that the first spoken utterance captured by the first audio data received at block 305 and the second spoken utterance captured by the second audio data received at block 335 satisfy one or more temporal criteria relative to one another, then the system proceeds to block 320, and the flow ends. On the other hand, if, at an iteration of block 360, the system determines that the first spoken utterance captured by the first audio data received at block 305 and the second spoken utterance captured by the second audio data received at block 335 satisfy one or more temporal criteria relative to one another, then the system proceeds to block 365.

At block 365, in response to the first predicted output and the second predicted output satisfying the secondary threshold (as determined at block 315 and block 345, respectively) but not satisfying the primary threshold (as determined at block 325 and block 350, respectively), and in response to the first spoken utterance captured by the first audio data received at block 305 and the second spoken utterance captured by the second audio data received at block 335 satisfying one or more temporal criteria relative to one another (as determined at block 360), the system identifies a failed hotword attempt (e.g., the system determines that the user made a failed attempt to invoke the assistant using a word or phrase that is not a hotword).

Still referring to block 365, in some implementations, the identifying the failed hotword attempt is further in response to determining that a similarity between the first spoken utterance and the second spoken utterance exceeds a similarity threshold. The system may allow for some variation as the user may try a different variant of a word or phrase after a number of failed hotword attempts. Additionally, in some implementations, the identifying the failed hotword attempt is further in response to determining that the probability indicated by the first predicted output and the probability indicated by the second predicted output correspond to a same hotword of the one or more hotwords (e.g., they are all close to the same hotword class).

Still referring to block 365, in some implementations, the system uses a model conditioned on acoustic features (e.g., prosody, non-verbal vocalizations, or other types of inferred audio command properties) to determine that the first audio data and the second audio data include a command. The model conditioned on acoustic features can be run as a second stage or alongside the hotword model. In some implementations, identifying the failed hotword attempt is further in response to determining that the first audio data and the second audio data include the command.

At block 370, the system determines an intended hotword corresponding to the failed hotword attempt that is identified at block 365. In some implementations, the intended hotword can be determined based on acoustic similarity between at least a portion of the first audio data, at least a portion of the second audio data, and the intended hotword. In other implementations, the system may enter a higher power state (e.g., wake up) and perform second-stage speech processing on the first audio data and the second audio data using an on-device speech recognition engine. In this case, the system may use natural language understanding to determine the intended hotword, e.g., based on a text embedding similarity between a transcription of the first audio data, a transcription of the second audio data, and supported hotwords.

At block 375, in response to identifying the failed hotword attempt at block 365, the system provides a hint that is responsive to the failed hotword attempt. In some implementations, providing the hint includes displaying the intended hotword (determined at block 370) on a display of the client device or providing, by the client device, an audio response that includes the intended hotword. The hint may clarify the available vocabulary (i.e., supported hotwords). The hint may indicate that the system has determined that the user may be attempting to say a particular supported hotword (e.g., the intended hotword determined at block 370). In a case where the failed hotword attempt (e.g., "volume increase") is similar to multiple supported hotwords (e.g., "volume up" and "volume down"), the hint may include the multiple supported hotwords. In other implementations, the system may not provide the hint at block 375 and may instead proceed directly from block 370 to block 380.

At block 380, the system performs an action corresponding to the intended hotword that is determined at block 370. For example, the system may initiate one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions based on the intended hotword (e.g., a common task such as changing the device volume, advancing to the next track, pausing, etc.). In some implementations, different intended hotwords may correspond to different actions (e.g., a "volume up" hotword may correspond to an action that increases the volume, and a "volume down" hotword may correspond to an action that decreases the volume).

Still referring to block 380, in some implementations, the system may determine a level of confidence associated with the determination of the intended hotword at block 370, and the system may perform the action at block 380 only if the level of confidence exceeds a threshold level and/or only if a single intended hotword is determined at block 370. Additionally, in some implementations, the system may perform the action at block 380 only if the intended hotword is in a particular subset of the supported hotwords.

After block 380, the system then proceeds back to block 305.

Figure 4:
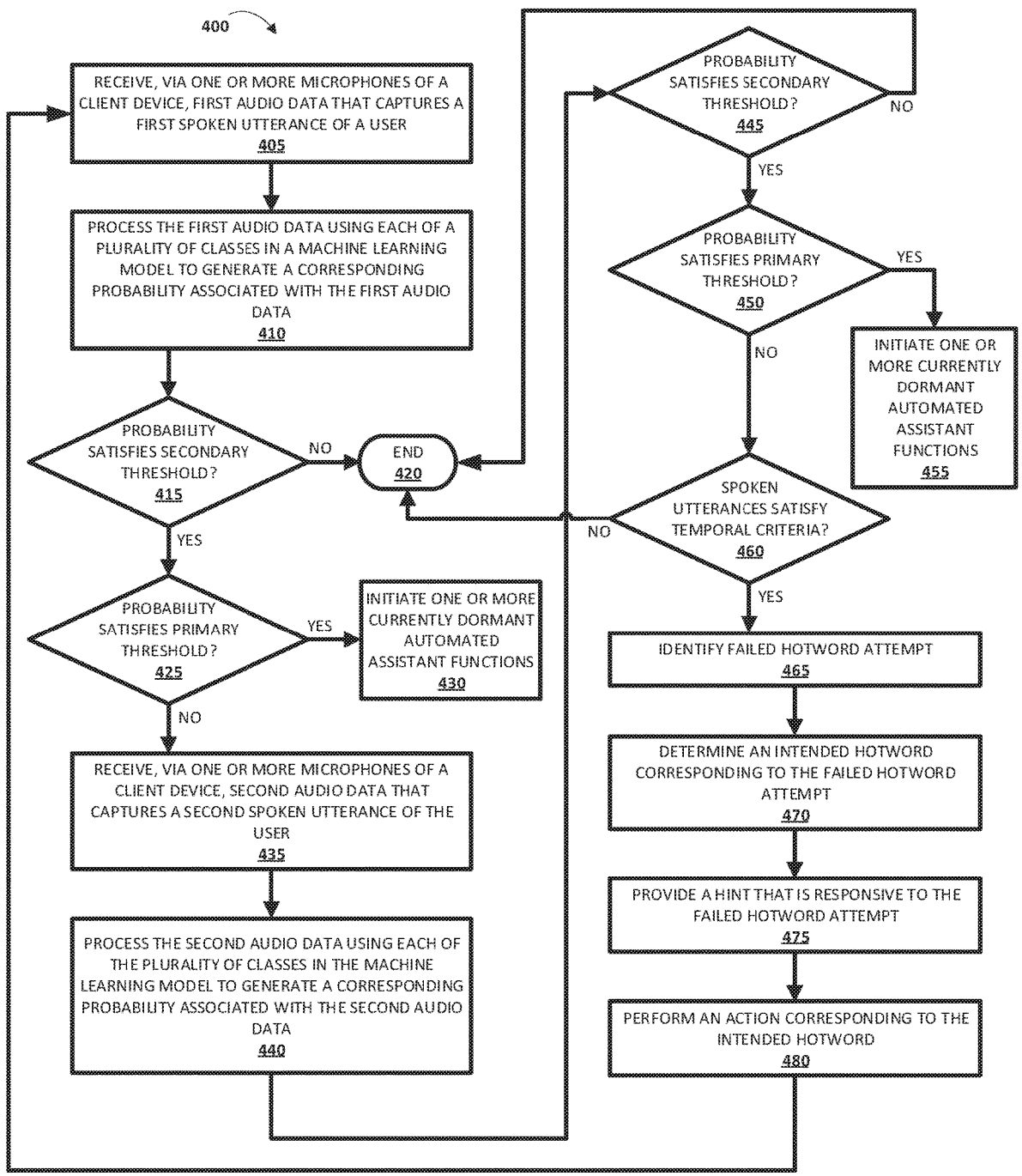
FIG. 4 depicts a flowchart illustrating an example method of identifying a failed hotword attempt, in accordance with various implementations.

FIG. 4 depicts a flowchart illustrating an example method 400 of identifying a failed hotword attempt. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 405, the system receives, via one or more microphones of a client device, first audio data that captures a first spoken utterance of a user.

At block 410, the system processes the first audio data received at block 405 using each of a plurality of classes in a machine learning model to generate a corresponding probability associated with the first audio data. In implementations, each of the classes is associated with a corresponding hotword of a plurality of hotwords and each of the corresponding probabilities is associated with a probability of the corresponding hotword being present in the first audio data. The machine learning model can be, for example, an on-device hotword detection model and/or other machine learning model.

Still referring to block 410, in an example, a first class in a machine learning model may correspond to the hotword "next track", a second class in the machine learning model may correspond to the hotword "previous track", and a third class in the machine learning model may correspond to the hotword "pause". In implementations, the system may selectively process the audio data over an active subset of the plurality of classes in the machine learning model. The active subset may include classes that correspond to hotwords that are active in a particular context (e.g., classes in the machine learning model corresponding to "next track", "previous track", and "pause" may be included in the active subset only when audio and/or video is actively being rendered).

In other implementations, in the method 400, instead of using a machine learning model with a plurality of classes, the system can use a plurality of machine learning models, with each of the machine learning models being associated with a corresponding hotword of plurality of hotwords.

At block 415, the system determines whether or not the probability of one (or more) of the plurality of hotwords being present in the first audio data (generated at block 410) satisfies a secondary threshold that is less indicative of the one of the plurality of hotwords being present in audio data than is a primary threshold. If, at an iteration of block 415, the system determines that it is not the case that the probability of one of the plurality of hotwords being present in the first audio data satisfies the secondary threshold, then the system proceeds to block 420, and the flow ends. On the other hand, if, at an iteration of block 415, the system determines that the probability of one of the plurality of hotwords being present in the first audio data generated at block 410 satisfies the secondary threshold, then the system proceeds to block 425.

Still referring to block 415, in an example, assume the probability of one of the plurality of hotwords being present in the first audio data (generated at block 410) is 0.88, and the probability must be greater than 0.65 to satisfy the secondary threshold at block 415. Based on the probability of 0.88 satisfying the secondary threshold of 0.65, the system proceeds to block 425.

At block 425, the system determines whether or not the probability of one of the plurality of hotwords being present in the first audio data (generated at block 410) satisfies the primary threshold. If, at an iteration of block 425, the system determines that it is not the case that the probability of one of the plurality of hotwords being present in the first audio data satisfies the primary threshold, then the system proceeds to block 435. On the other hand, if, at an iteration of block 425, the system determines that the probability of one of the plurality of hotwords being present in the first audio data generated at block 410 satisfies the primary threshold, then the system proceeds to block 430 and initiates one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions that are responsive to the first audio data (e.g., a common task such as changing the device volume).

Still referring to block 430, in an example, assume the probability of one of the plurality of hotwords being present in the first audio data (generated at block 410) is 0.88, and the probability must be greater than 0.85 to satisfy the primary threshold at block 425 and activate one or more currently dormant automated assistant functions at block 430. Based on the probability of 0.88 satisfying the threshold of 0.85, the system proceeds to block 430 and initiates the one or more currently dormant automated assistant functions as the user intended.

At block 435, the system receives, via one or more microphones of a client device, second audio data that captures a second spoken utterance of the user.

At block 440, the system processes the second audio data received at block 435 using each of the plurality of classes in the machine learning model to generate a corresponding probability associated with the second audio data. In implementations, each of the corresponding probabilities are associated with a probability of the corresponding hotword being present in the second audio data. In implementations, the generated output can be, for example, a probability and/or other likelihood measures.

At block 445, the system determines whether or not the probability of one (or more) of the plurality of hotwords being present in the second audio data (generated at block 440) satisfies the secondary threshold. If, at an iteration of block 445, the system determines that it is not the case that the probability of one of the plurality of hotwords being present in the second audio data satisfies the secondary threshold, then the system proceeds to block 420, and the flow ends. On the other hand, if, at an iteration of block 445, the system determines that the probability of one of the plurality of hotwords being present in the second audio data satisfies the secondary threshold, then the system proceeds to block 450.

Still referring to block 445, in an example, assume the probability of one of the plurality of hotwords being present in the second audio data (generated at block 440) is 0.88, and the probability must be greater than 0.65 to satisfy the secondary threshold at block 445. Based on the probability of 0.88 satisfying the secondary threshold of 0.65, the system proceeds to block 450.

At block 450, the system determines whether or not the probability of one of the plurality of hotwords being present in the second audio data (generated at block 440) satisfies the primary threshold. If, at an iteration of block 450, the system determines that it is not the case that the probability of one of the plurality of hotwords being present in the second audio data satisfies the primary threshold, then the system proceeds to block 460. On the other hand, if, at an iteration of block 450, the system determines that the probability of one of the plurality of hotwords being present in the second audio data satisfies the primary threshold, then the system proceeds to block 455 and initiates one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions that are responsive to the second audio data (e.g., a common task such as changing the device volume).

Still referring to block 450, in an example, assume the probability of one of the plurality of hotwords being present in the second audio data (generated at block 440) is 0.88, and the probability must be greater than 0.85 to satisfy the primary threshold at block 450 and activate one or more currently dormant automated assistant functions at block 455. Based on the probability of 0.88 satisfying the threshold of 0.85, the system proceeds to block 455 and initiates the one or more currently dormant automated assistant functions as the user intended.

At block 460, the system determines whether or not the first spoken utterance captured by the first audio data received at block 405 and the second spoken utterance captured by the second audio data received at block 435 satisfy one or more temporal criteria relative to one another. If, at an iteration of block 460, the system determines that it is not the case that the first spoken utterance captured by the first audio data received at block 405 and the second spoken utterance captured by the second audio data received at block 435 satisfy one or more temporal criteria relative to one another, then the system proceeds to block 420, and the flow ends. On the other hand, if, at an iteration of block 360, the system determines that the first spoken utterance captured by the first audio data received at block 405 and the second spoken utterance captured by the second audio data received at block 435 satisfy one or more temporal criteria relative to one another, then the system proceeds to block 465.

At block 465, in response to the probability of the one of the plurality of hotwords being present in the first audio data satisfying the secondary threshold (as determined at block 415) but not satisfying the primary threshold (as determined at block 425) and the probability of the one of the plurality of hotwords being present in the second audio data satisfying the secondary threshold (as determined at block 445) but not satisfying the primary threshold (as determined at block 450), and in response to the first spoken utterance and the second spoken utterance satisfying one or more temporal criteria relative to one another (as determined at block 460), the system identifies a failed hotword attempt (e.g., the system determines that the user made a failed attempt to invoke the assistant using a word or phrase that is not a hotword).

Still referring to block 465, in some implementations, the identifying the failed hotword attempt is further in response to determining that a similarity between the first spoken utterance and the second spoken utterance exceeds a similarity threshold. In some implementations, the system uses a model conditioned on acoustic features to determine that the first audio data and the second audio data include a command. In some implementations, identifying the failed hotword attempt is further in response to determining that the first audio data and the second audio data include the command.

At block 470, the system determines an intended hotword corresponding to the failed hotword attempt that is identified at block 465. In some implementations, the intended hotword can be determined based on acoustic similarity between at least a portion of the first audio data, at least a portion of the second audio data, and the intended hotword.

At block 475, in response to identifying the failed hotword attempt at block 465, the system provides a hint that is responsive to the failed hotword attempt. In some implementations, providing the hint includes displaying the intended hotword (determined at block 470) on a display of the client device or providing, by the client device, an audio response that includes the intended hotword. In some implementations, the system may not provide the hint at block 475 and may instead proceed directly from block 470 to block 480.

At block 480, the system performs an action corresponding to the intended hotword (determined at block 470). For example, the system may initiate one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, transmission of the recognized text to the remote server, and/or directly triggering one or more actions based on the intended hotword (e.g., a common task such as changing the device volume). After block 480, the system then proceeds back to block 405.

In implementations, the system may identify new words to add to the model as hotwords, based on the audio data of the failed hotword attempts. For example, the system may train/fine-tune the hotword model(s) locally based on the utterances captured in the audio data associated with the failed hotword attempt. In other implementations, the system may call out to a server-side system to obtain updated hotword model(s) which include a word or phrase in the utterances that the user was attempting to use as a hotword in the failed hotword attempt (e.g., the system may download a more suitable hotword model (or models) from a server based on the types of commands the user expects to speak). In some implementations, the system may reduce one or more hotword thresholds based on the failed hotword attempts (e.g., to allow for a user's accent/pronunciation of the hotword).

In implementations, in the case where hotwords are contextually active, the system can use the failed hotword attempt to make the hotword active in this new context. The system can provide, as the hint, feedback to indicate that a particular hotword will work in the current context (e.g., time of day, running applications, etc.) in the future.

In other implementations, in response to receiving audio data including multiple acoustically similar utterances within close temporal proximity, the system may process the audio data using an on-device speech recognition engine to generate text. In this case, the system may use natural language understanding to determine the intended hotword, e.g., based on a semantic similarity between the text generated by the speech recognition engine and a supported hotword.

It is noted that, in various implementations of methods 300 and 400, the first audio data, the second audio data, the first predicted output, the second predicted output, the probabilities, the primary threshold, the secondary threshold, and/or the intended hotword can be stored locally on the client device. In these and other manners, the occurrence of failed hotword attempts can be mitigated. Further, this enables improved performance of on-device machine learning model(s) that process audio data capturing spoken utterances in cases where a user misremembers a hotword.

Figure 5:
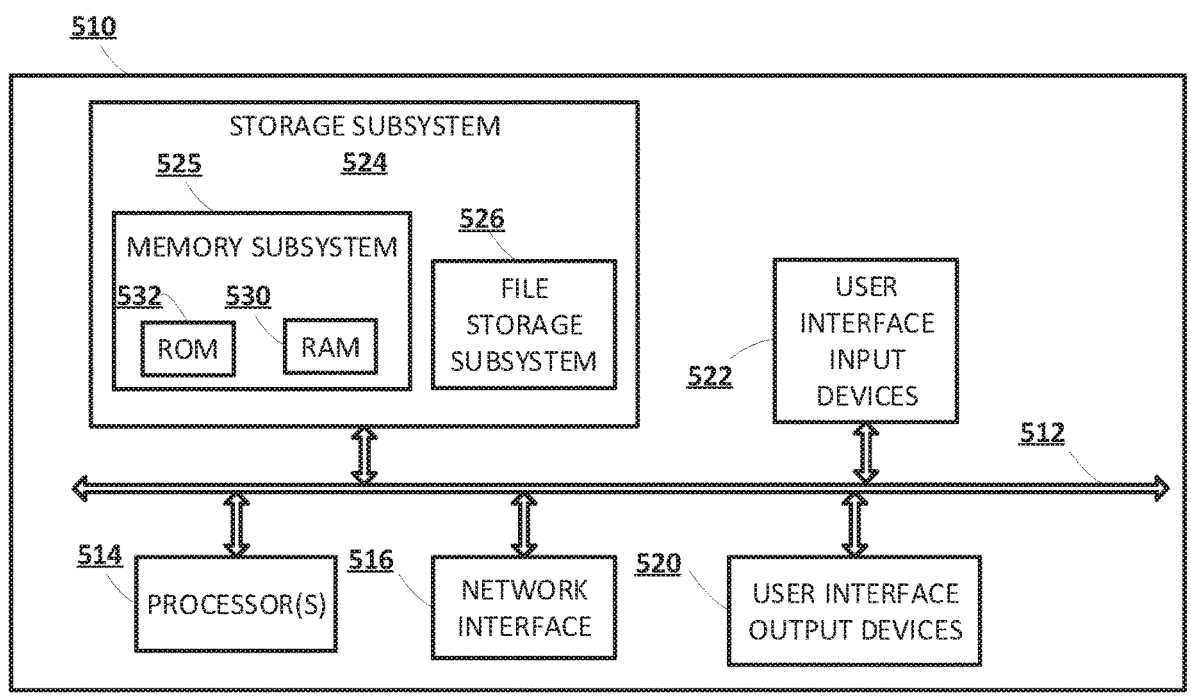
FIG. 5 depicts an example architecture of a computing device.

FIG. 5 is a block diagram of an example computing device 510 that may optionally be utilized to perform one or more aspects of techniques described herein. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1A and 1B.

These software modules are generally executed by processor 514 alone or in combination with other processors.

The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving, via one or more microphones of a client device, first audio data that captures a first spoken utterance of a user;
processing the first audio data using one or more machine learning models to generate a first predicted output that indicates a probability of one or more hotwords being present in the first audio data;
determining that the first predicted output satisfies a secondary threshold that is less indicative of the one or more hotwords being present in audio data than is a primary threshold but does not satisfy the primary threshold;
receiving, via the one or more microphones of the client device, second audio data that captures a second spoken utterance of a user;
processing the second audio data using the one or more machine learning models to generate a second predicted output that indicates a probability of the one or more hotwords being present in the second audio data;
determining that the second predicted output satisfies the secondary threshold but does not satisfy the primary threshold;
in response to the first predicted output and the second predicted output satisfying the secondary threshold but not satisfying the primary threshold, and in response to the first spoken utterance and the second spoken utterance satisfying one or more temporal criteria relative to one another, identifying a failed hotword attempt; and
in response to identifying the failed hotword attempt:
determining an intended hotword corresponding to the failed hotword attempt;
providing a hint that is responsive to the failed hotword attempt, comprising displaying the intended hotword on a display of the client device or providing, by the client device, an audio response that includes the intended hotword; and
adding a new hotword to a set of supported hotwords, the new hotword being a word or a phrase included in both the first audio data and the second audio data, wherein:
prior to adding the new hotword to the set of supported hotwords, the new hotword was active in a different context but not active in a current context; and
adding the new hotword to the set of supported hotwords comprises making the new hotword active in the current context.

2. The method according to claim 1, wherein identifying the failed hotword attempt is further in response to determining that a similarity between the first spoken utterance and the second spoken utterance exceeds a similarity threshold.

3. The method according to claim 1, wherein identifying the failed hotword attempt is further in response to determining that the probability indicated by the first predicted output and the probability indicated by the second predicted output correspond to a same hotword of the one or more hotwords.

4. The method according to claim 1, further comprising determining, using a model conditioned on acoustic features, that the first audio data and the second audio data comprise a command,
wherein identifying the failed hotword attempt is further in response to the first audio data and the second audio data comprising the command.

5. The method according to claim 1, wherein the intended hotword is determined based on acoustic similarity between at least a portion of the first audio data, at least a portion of the second audio data, and the intended hotword.

6. The method according to claim 1, further comprising performing an action corresponding to the intended hotword.

7. The method according to claim 1, wherein the intended hotword is determined based on semantic similarity between the intended hotword and text generated based on at least a portion of the first audio data or based on at least a portion of the second audio data.

8. The method according to claim 1, wherein the different context comprises a first set of running applications and the current context comprises a second set of running applications.

9. The method according to claim 1, wherein the different context comprises a first time of day and the current context comprises a second time of day.

10. The method according to claim 1, wherein identifying the failed hotword attempt is further in response to determining that the first audio data and the second audio data are acoustically similar.

11. The method according to claim 1, wherein neither the intended hotword nor another supported hotword is included in the first spoken utterance and the second spoken utterance.

12. A computer program product comprising one or more non-transitory computer-readable storage media having program instructions collectively stored on the one or more non-transitory computer-readable storage media, the program instructions executable to:
receive, via one or more microphones of a client device, first audio data that captures a first spoken utterance of a user;
process the first audio data using each of a plurality of classes in a machine learning model to generate a corresponding probability associated with the first audio data, each of the classes being associated with a corresponding hotword of a plurality of hotwords and each of the corresponding probabilities being associated with a probability of the corresponding hotword being present in the first audio data;
determine that the probability of one of the plurality of hotwords being present in the first audio data satisfies a secondary threshold that is less indicative of the one of the plurality of hotwords being present in audio data than is a primary threshold but does not satisfy the primary threshold;
receive, via the one or more microphones of the client device, second audio data that captures a second spoken utterance of a user;
process the second audio data using each of the plurality of classes in the machine learning model to generate a corresponding probability associated with the second audio data, each of the corresponding probabilities being associated with a probability of the corresponding hotword being present in the second audio data;
determine that the probability of the one of the plurality of hotwords being present in the second audio data satisfies the secondary threshold but does not satisfy the primary threshold;
in response to the probability of the one of the plurality of hotwords being present in the first audio data satisfying the secondary threshold but not satisfying the primary threshold and the probability of the one of the plurality of hotwords being present in the second audio data satisfying the secondary threshold but not satisfying the primary threshold, and in response to the first spoken utterance and the second spoken utterance satisfying one or more temporal criteria relative to one another, identify a failed hotword attempt; and
in response to identifying the failed hotword attempt:
determine an intended hotword corresponding to the failed hotword attempt;
provide a hint that is responsive to the failed hotword attempt, comprising displaying the intended hotword on a display of the client device or providing, by the client device, an audio response that includes the intended hotword; and
add a new hotword to a set of supported hotwords, the new hotword being a word or a phrase included in both the first audio data and the second audio data, wherein:
prior to adding the new hotword to the set of supported hotwords, the new hotword was active in a different context but not active in a current context; and
adding the new hotword to the set of supported hotwords comprises making the new hotword active in the current context.

13. The computer program product according to claim 12, wherein identifying the failed hotword attempt is further in response to determining that a similarity between the first spoken utterance and the second spoken utterance exceeds a similarity threshold.

14. The computer program product according to claim 12, wherein:
the program instructions are further executable to determine, using a model conditioned on acoustic features, that the first audio data and the second audio data comprise a command; and
identifying the failed hotword attempt is further in response to the first audio data and the second audio data comprising the command.

15. The computer program product according to claim 12, wherein the intended hotword is determined based on acoustic similarity between at least a portion of the first audio data, at least a portion of the second audio data, and the intended hotword.

16. The computer program product according to claim 12, wherein the program instructions are further executable to perform an action corresponding to the intended hotword.

17. A system comprising:
a processor, a computer-readable memory, one or more computer-readable storage media, and program instructions collectively stored on the one or more computer-readable storage media, the program instructions executable to:
receive, via one or more microphones of a client device, first audio data that captures a first spoken utterance of a user;
process the first audio data using one or more machine learning models to generate a first predicted output that indicates a probability of one or more hotwords being present in the first audio data;
determine that the first predicted output satisfies a secondary threshold that is less indicative of the one or more hotwords being present in audio data than is a primary threshold but does not satisfy the primary threshold;
receive, via the one or more microphones of the client device, second audio data that captures a second spoken utterance of a user;
process the second audio data using the one or more machine learning models to generate a second predicted output that indicates a probability of the one or more hotwords being present in the second audio data;
determine that the second predicted output satisfies the secondary threshold but does not satisfy the primary threshold;
in response to the first predicted output and the second predicted output satisfying the secondary threshold but not satisfying the primary threshold, and in response to the first spoken utterance and the second spoken utterance satisfying one or more temporal criteria relative to one another, identify a failed hotword attempt; and
in response to identifying the failed hotword attempt:
determine an intended hotword corresponding to the failed hotword attempt;
perform an action based on the failed hotword attempt, comprising displaying the intended hotword on a display of the client device or providing, by the client device, an audio response that includes the intended hotword; and
add a new hotword to a set of supported hotwords, the new hotword being a word or a phrase included in both the first audio data and the second audio data, wherein:
prior to adding the new hotword to the set of supported hotwords, the new hotword was active in a different context but not active in a current context; and
adding the new hotword to the set of supported hotwords comprises making the new hotword active in the current context.

18. The system according to claim 17, wherein:
the program instructions are further executable to determine, using a model conditioned on acoustic features, that the first audio data and the second audio data comprise a command; and
identifying the failed hotword attempt is further in response to (i) the first audio data and the second audio data comprising the command and (ii) determining that a similarity between the first spoken utterance and the second spoken utterance exceeds a similarity threshold.

19. The system according to claim 17, wherein identifying the failed hotword attempt is further in response to determining that the probability indicated by the first predicted output and the probability indicated by the second predicted output correspond to a same hotword of the one or more hotwords.

* * * * *